United States Patent
Gilbert-Eyres et al.

(10) Patent No.: US 12,049,232 B2
(45) Date of Patent: Jul. 30, 2024

(54) SYSTEM AND METHOD FOR DETERMINING A SAMPLING RATE OF OCCUPANCY DATA FOR AN AUTOMOTIVE VEHICLE

(71) Applicant: GM GLOBAL TECHNOLOGY OPERATIONS LLC, Detroit, MI (US)

(72) Inventors: Matthew E. Gilbert-Eyres, Rochester, MI (US); Eric T. Hosey, Royal Oak, MI (US); Russell A. Patenaude, Macomb Township, MI (US); Gaurav Talwar, Novi, MI (US); Matthew Neely, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 235 days.

(21) Appl. No.: 17/897,337

(22) Filed: Aug. 29, 2022

(65) Prior Publication Data

US 2024/0067190 A1     Feb. 29, 2024

(51) Int. Cl.
*B60W 40/08*     (2012.01)
*B60W 50/00*     (2006.01)
*B60W 60/00*     (2020.01)

(52) U.S. Cl.
CPC ........ *B60W 50/0098* (2013.01); *B60W 40/08* (2013.01); *B60W 2520/00* (2013.01); *B60W 2540/221* (2020.02); *B60W 2540/227* (2020.02)

(58) Field of Classification Search
CPC .......................... B60W 40/08; B60W 50/0098
See application file for complete search history.

(56) References Cited

U.S. PATENT DOCUMENTS

| | | | | |
|---|---|---|---|---|
| 2010/0007523 A1* | 1/2010 | Hatav | ............... | G01C 21/3697 340/901 |
| 2016/0203660 A1* | 7/2016 | Chowdhury | ......... | G01C 21/165 701/33.4 |
| 2019/0056230 A1* | 2/2019 | Hatav | ............... | G08G 1/09626 |

FOREIGN PATENT DOCUMENTS

| | | |
|---|---|---|
| DE | 10340839 A1 | 3/2004 |
| DE | 10241993 B3 | 4/2004 |
| DE | 102017201965 A1 | 8/2018 |
| EP | 0881132 A1 | 12/1998 |
| WO | 2015118127 A1 | 8/2015 |

\* cited by examiner

*Primary Examiner* — Long T Tran
(74) *Attorney, Agent, or Firm* — Quinn IP Law (57) ABSTRACT

A method for determining a sampling rate of occupancy data for a vehicle includes determining a vehicle speed and detecting whether an interrupt condition is present. If the speed is within a first speed range and no interrupt condition is detected, then a first sampling rate is selected for sampling the occupancy data. If the speed is within a second speed range that is higher than the first speed range, and/or if the interrupt condition is detected, then a second sampling rate which is faster than the first sampling rate is selected for sampling the occupancy data. A primary electronic control unit (ECU) may be configured for sampling the occupancy data. If the second sampling rate is selected and a computational demand of the primary ECU exceeds a predetermined threshold, then a portion of the computational demand may be transferred to one or more secondary ECUs for sampling the data.

20 Claims, 3 Drawing Sheets

SYSTEM AND METHOD FOR DETERMINING A SAMPLING RATE OF OCCUPANCY DATA FOR AN AUTOMOTIVE VEHICLE

INTRODUCTION

This disclosure relates generally to systems and methods for determining a sampling rate for sampling occupancy data for an automotive vehicle.

Safety systems within automotive vehicles may take samples of data relating to the vehicle's occupants (including the vehicle driver), as well as selected data relating to the vehicle itself in relation to other nearby vehicles or obstacles. This data may be used in various safety-related computations on-board the vehicle, such as to assess a driver's wakefulness, etc. However, the accumulation of such data, and the carrying out of the aforementioned computations, may place an undesirable computational burden on the components involved.

SUMMARY

According to one embodiment, a method for determining a sampling rate of occupancy data for an automotive vehicle includes determining a speed of the automotive vehicle, and detecting whether an interrupt condition is present. If the speed is within a first speed range and no interrupt condition is detected, then a first sampling rate is selected for sampling the occupancy data. Alternatively, if the speed is within a second speed range that is higher than the first speed range, and/or if the interrupt condition is detected, then a second sampling rate is selected for sampling the occupancy data, wherein the second sampling rate is faster than the first sampling rate.

In this method, the occupancy data may include one or more of a presence of a passenger within the automotive vehicle, a location of the passenger within the automotive vehicle, a weight of the passenger within the automotive vehicle, a presence of a connected device indicative of the presence of the passenger within the automotive vehicle, a span of the passenger within the automotive vehicle, and a proximity of the passenger to a point of interest within the automotive vehicle. Additionally, the interrupt condition may include one or more of a gear selector status change prompt, a passenger weight sensor change prompt, a door opening prompt, a seatbelt unbuckling prompt, a vehicle proximity prompt, a collision alert prompt, a hard braking prompt, a hard acceleration prompt, a hard cornering prompt, a hard steering prompt, a lane keep assist warning prompt, a lane change prompt, a sudden heading change prompt, a driver biometrics prompt and a distraction element warning prompt.

The first and second sampling rates may be respective rates at which a controller onboard the automotive vehicle samples the occupancy data from one or more sensors onboard the automotive vehicle. The method may further include sampling the occupancy data at the selected first or second sampling rate, and may even further include repeating the determining, detecting, selecting and sampling steps for a plurality of cycles.

The method may further include selecting a third sampling rate for sampling the occupancy data if the speed is within a third speed range that is higher than the first speed range and lower than the second speed range. In this arrangement, the third sampling rate may be faster than the first sampling rate and slower than the second sampling rate.

This arrangement may further include sampling the occupancy data at the selected first, second or third sampling rate, and may even further include repeating the determining, detecting, selecting and sampling steps for a plurality of cycles.

A primary electronic control unit (ECU) may be configured for sampling the occupancy data. The method may further include transferring a portion of a computational demand of the primary ECU associated with the sampling to one or more secondary ECUs configured for sampling the occupancy data, if the second sampling rate is selected for sampling the occupancy data and the computational demand of the primary ECU exceeds a predetermined threshold.

According to another embodiment, a method for determining a sampling rate of occupancy data for an automotive vehicle includes: (i) determining a speed of the automotive vehicle; (ii) detecting whether an interrupt condition is present; (iii) if the speed is within a low speed range and no interrupt condition is detected, then selecting a low sampling rate for sampling the occupancy data; (iv) if the speed is within a medium speed range that is higher than the low speed range and no interrupt condition is detected, then selecting a medium sampling rate for sampling the occupancy data, wherein the medium sampling rate is faster than the low sampling rate; (v) if the speed is within a high speed range that is higher than the medium speed range and/or if the interrupt condition is detected, then selecting a high sampling rate for sampling the occupancy data, wherein the high sampling rate is faster than the medium sampling rate; (vi) sampling the occupancy data at the selected low, medium or high sampling rate; and (vii) repeating the determining, detecting, selecting and sampling steps for a plurality of cycles.

In this embodiment, the occupancy data may include one or more of a presence of a passenger within the automotive vehicle, a location of the passenger within the automotive vehicle, a weight of the passenger within the automotive vehicle, a presence of a connected device indicative of the presence of the passenger within the automotive vehicle, a span of the passenger within the automotive vehicle, and a proximity of the passenger to a point of interest within the automotive vehicle. Additionally, the interrupt condition may include one or more of a gear selector status change prompt, a passenger weight sensor change prompt, a door opening prompt, a seatbelt unbuckling prompt, a vehicle proximity prompt, a collision alert prompt, a hard braking prompt, a hard acceleration prompt, a hard cornering prompt, a hard steering prompt, a lane keep assist warning prompt, a lane change prompt, a sudden heading change prompt, a driver biometrics prompt and a distraction element warning prompt.

The low, medium and high sampling rates may be respective rates at which a controller onboard the automotive vehicle samples the occupancy data from one or more sensors onboard the automotive vehicle. A primary ECU may be configured for sampling the occupancy data, and the method may further include transferring a portion of a computational demand of the primary ECU associated with the sampling to one or more secondary ECUs configured for sampling the occupancy data, if the high sampling rate is selected for sampling the occupancy data and the computational demand exceeds a predetermined threshold.

According to yet another embodiment, a system for determining a sampling rate of occupancy data for an automotive vehicle includes: (i) a speed determination module configured for determining a speed of the automotive vehicle; (ii) an interrupt condition detection module configured for detecting whether an interrupt condition is present and for setting an interrupt condition flag if the interrupt condition is detected; (iii) a primary sampling module configured for sampling the occupancy data at a first sampling rate and at a second sampling rate that is faster than the first sampling rate; and (iv) a workload control module configured for receiving the speed from the speed determination module and the interrupt condition flag from the interrupt condition detection module. The workload control module is further configured to cause the primary sampling module to sample the occupancy data at the first sampling rate, if the speed is within a first speed range and no interrupt condition flag is set, and cause the primary sampling module to sample the occupancy data at the second sampling rate, if the speed is within a second speed range that is higher than the first speed range and/or if the interrupt condition flag is set.

In this system, the occupancy data may include one or more of a presence of a passenger within the automotive vehicle, a location of the passenger within the automotive vehicle, a weight of the passenger within the automotive vehicle, a presence of a connected device indicative of the presence of the passenger within the automotive vehicle, a span of the passenger within the automotive vehicle, and a proximity of the passenger to a point of interest within the automotive vehicle. Additionally, the interrupt condition may include one or more of a gear selector status change prompt, a passenger weight sensor change prompt, a door opening prompt, a seatbelt unbuckling prompt, a vehicle proximity prompt, a collision alert prompt, a hard braking prompt, a hard acceleration prompt, a hard cornering prompt, a hard steering prompt, a lane keep assist warning prompt, a lane change prompt, a sudden heading change prompt, a driver biometrics prompt and a distraction element warning prompt.

The first and second sampling rates may be respective rates at which the primary sampling module samples the occupancy data from one or more sensors onboard the automotive vehicle. The system may further include one or more secondary sampling modules configured for sampling the occupancy data, wherein the workload control module may be further configured to cause a portion of a computational demand of the primary sampling module associated with the sampling to be transferred to the one or more secondary sampling modules, if the second sampling rate is selected for sampling the occupancy data and the computational demand exceeds a predetermined threshold.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring now to the drawings, wherein like numerals indicate like parts in the several views, a system 20 and method 100 for determining a sampling rate of occupancy data 22 for an automotive vehicle 10 are shown and described herein.

Figure 1:
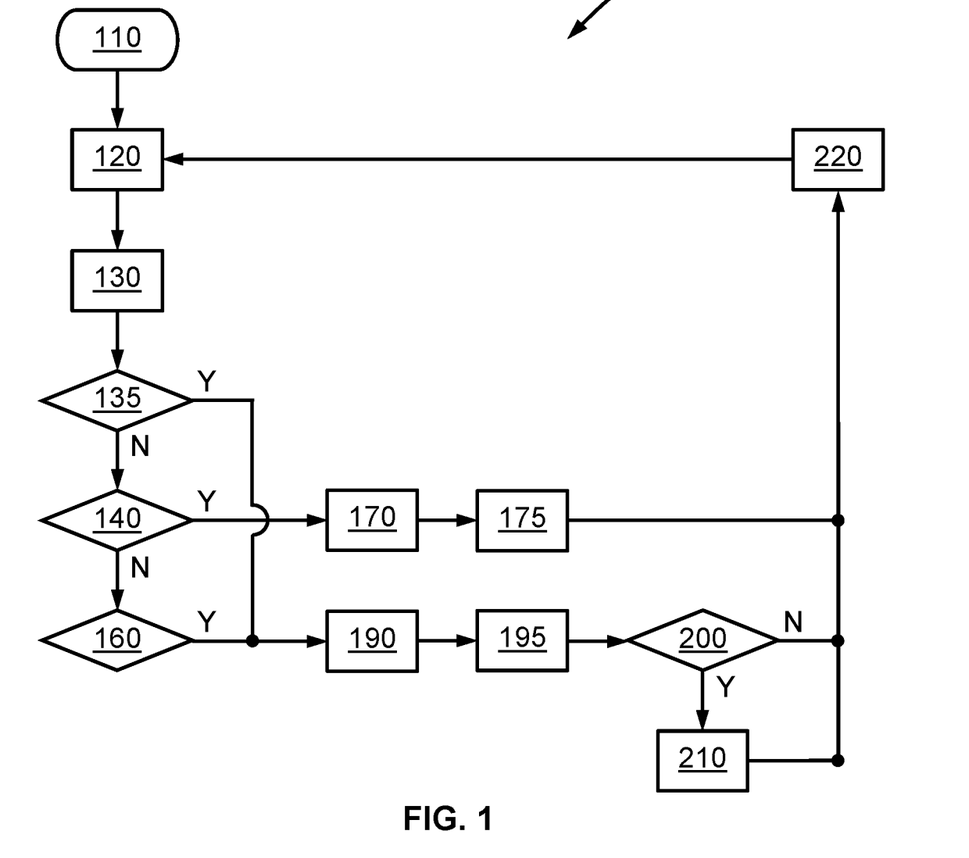
FIG. 1 is a flowchart of one embodiment of the method of the present disclosure.
Figure 5:
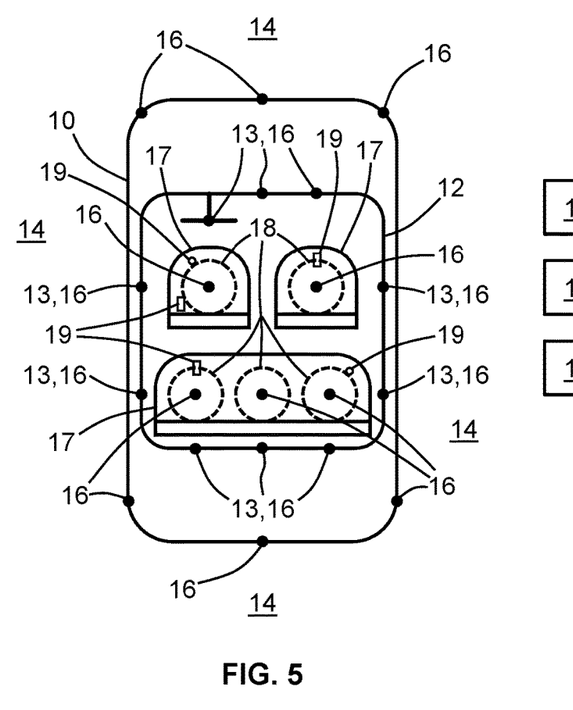
FIG. 5 is a schematic top view of an automotive vehicle showing various sensors and points of interest associated with the vehicle and the system of the present disclosure.
Figure 6:
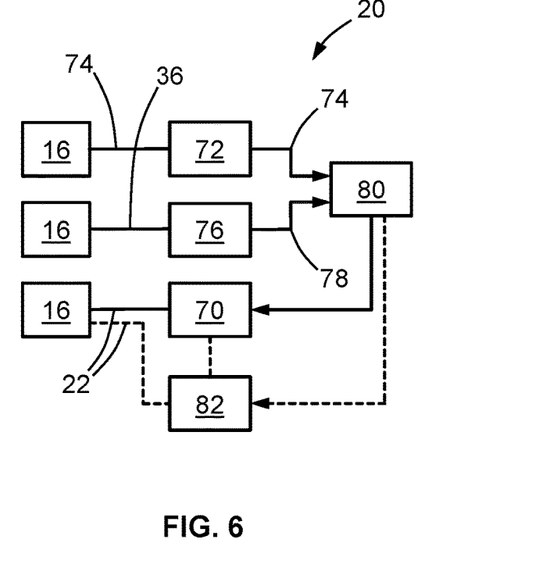
FIG. 6 is a block diagram of the system of the present disclosure.

FIG. 1 shows an embodiment of the method 100, while FIG. 5 shows a schematic top view of a representative automotive vehicle 10 having various sensors 16 and points of interest 13 associated with the vehicle 10 and the system 20, and FIG. 6 shows a block diagram of the system 20 and its various components.

In FIG. 5, the vehicle 10 is shown as having an interior environment 12 (also referred to as a passenger cabin) and an exterior environment 14 surrounding the exterior of the vehicle 10. The vehicle 10 is also shown as having three separate seats 17—i.e., two front seats, each of which is designed to accommodate one passenger 18, and a single rear bench seat 17 designed to accommodate three passengers 18. (Note that each of the passengers 18 is illustrated as a dashed circle, which may also represent the "seatprint" where a passenger 18 may sit. Further, note that as used herein, "passenger" may include the driver of the vehicle 10 as well.) Each of the seats 17 includes one or more sensors 16 or intermediary devices for sensing or detecting various occupancy data 22, such as the presence 24 (or absence) of one of more passengers 18 within the seats 17.

Additional sensors 16 may be located at one or more points of interest 13 within the interior environment/cabin 12, such as at the steering wheel, at the dashboard, at the rear view mirror, at the side mirrors, at the front, rear and sides of the interior cabin's perimeter, at the brake pedal, at the accelerator pedal, etc. Sensors 16 may also be located on the exterior of the vehicle 10 as well, for observing or detecting various occupancy data 22 (such as the spatial location of one or more passengers 18 within the interior cabin 12) and/or for sensing or detecting various exterior environment data (such as the proximity of nearby vehicles). Each sensor 16 that is configured for detecting occupancy data 22 may be physically located at a point of interest 13 within the interior cabin 12, or the sensor 16 may be physically located at a location other than at a point of interest 13 but may be disposed and oriented such that it senses occupancy data 22 at one or more points of interest 13.

FIG. 1 shows a flowchart of one embodiment of the method 100 according to the present disclosure. The method 100 begins at block 110 (e.g., a "START" block) and proceeds to the next block. At block 120, a speed 74 of the vehicle 10 is determined. At block 130, a detection or interrogation is made as to whether an interrupt condition 36 is present, which may be detected by one or more of the sensors 16. As used herein, an interrupt condition 36 is any predetermined type of condition which interrupts the "normal" direction of process flow and causes a re-direction of the process flow in another direction. For example, at block 135, a query is made as to whether an interrupt condition 36 has been detected; if not, then the process flow follows the "N" (no) branch, but if an interrupt condition 36 has been detected, then the process flow is re-directed to follow the "Y" (yes) branch to block 190.

If no interrupt condition 36 is detected, then the process flow proceeds to block 140, where a detection or interrogation is made as to whether the vehicle speed 74 is within a first or "low" speed range $S_1$. If the vehicle speed 74 is within the first/low speed range $S_1$, then the process flow proceeds along the "Y" branch from block 140 to block 170, where a first or "low" sampling rate $R_1$ is selected for sampling the occupancy data 22. Alternatively, if the vehicle speed 74 is not within the first/low speed range $S_1$, then the process flow proceeds along the "N" branch from block 140 to block 160.

At block 160, a detection or interrogation is made as to whether the vehicle speed 74 is within a second or "high" speed range $S_2$ that is higher than the first/low speed range $S_1$. If the vehicle speed 74 is within the second/high speed range $S_2$, then the process flow proceeds along the "Y" branch from block 160 to block 190, where a second sampling rate $R_2$ is selected for sampling the occupancy data 22, wherein the second sampling rate $R_2$ is faster than the first sampling rate $R_1$.

The respective ranges of the first and second speed ranges $R_1$, $R_2$ may be arbitrarily selected. For example, the first/low speed range $R_1$ may be a vehicle speed 74 from 0 mph (miles per hour) to 39.999 mph, and the second/high speed range $R_2$ may be a vehicle speed 74 of 40 mph or greater. (Note that for this type of example where the second/high speed range $R_2$ is immediately above the first/low range $R_1$, block 160 may be omitted. This is because any forward vehicle speed 74 that is outside of the exemplary 0 to 39.999 mph range of the first/low speed range $R_1$ would automatically be within the second/high speed range $R_2$ of 40 mph or higher.) Similarly, the first and second sampling rates $S_1$, $S_2$ may be arbitrarily selected. For example, the first/low sampling rate $S_1$ may be once every five seconds and the second/high sampling rate $S_2$ may be once every 20 milliseconds.

Figure 2:
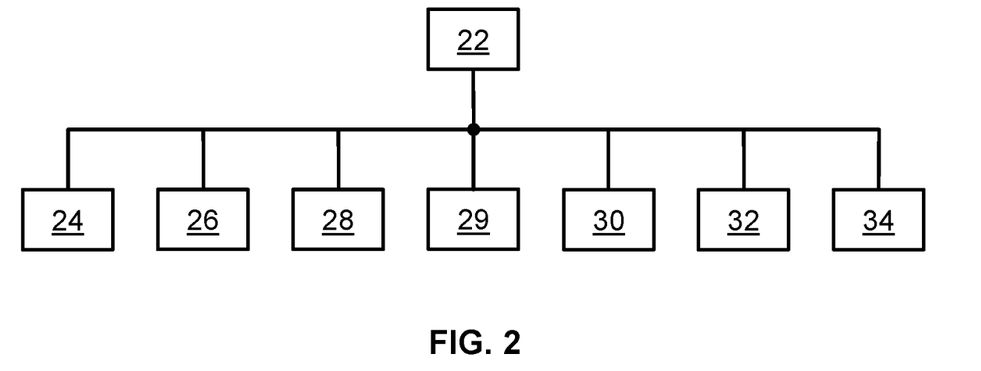
FIG. 2 is a block diagram showing various types of occupancy data.

FIG. 2 shows a block diagram of various types of occupancy data 22. These data 22 relate to the one or more occupants or passengers 18 within the vehicle 10, including the driver of the vehicle 10. The occupancy data 22 may include any one or more of the following: (i) the presence 24 (or absence) of one or more passengers 18 within the vehicle 10 (e.g., within each seat); (ii) the precise spatial location of each passenger 18 within the vehicle 10 (with respect to some arbitrarily selected reference frame within the vehicle 10); (iii) the weight 28 of each passenger 18 within the vehicle 10; (iv) the presence 29 of one or more connected devices 19 (e.g., cell phones, smart watches, etc.) that are indicative of the presence 24 of a passenger 18 within the vehicle 10; (v) the span 30 (e.g., side-to-side width, front-to-back depth, height, and/or other dimensional, geometric or volumetric measures) of each passenger 18 within the vehicle 10 (vi) the proximity 32 (e.g., nearness or distance) of each passenger 18 to one or more points of interest 13 within the vehicle 10; and (vii) any other passenger/occupancy data 34 (e.g., each passenger's heartbeat/heart rate, infrared signature, facial recognition points, etc.).

Figure 4:
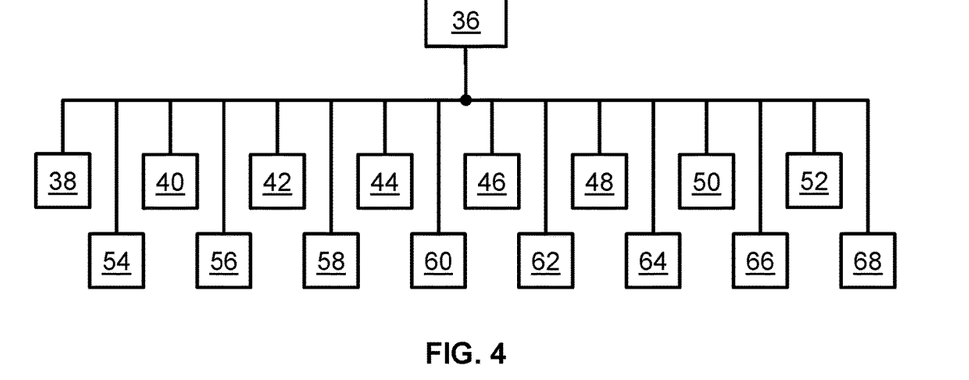
FIG. 4 is a block diagram showing various types of interrupt conditions.

FIG. 4 shows a block diagram of various types of interrupt conditions 36. The interrupt condition 36 may include any one or more of the following: a gear selector status change prompt 38, a passenger weight sensor change prompt 40, a door opening prompt 42, a seatbelt unbuckling prompt 44, a vehicle proximity prompt 46, a collision alert prompt 48, a hard braking prompt 50, a hard acceleration prompt 52, a hard cornering prompt 54, a hard steering prompt 56, a lane keep assist warning prompt 58, a lane change prompt 60, a sudden heading change prompt 62, a driver biometrics prompt 64, a distraction element warning prompt 66 and any other interrupt condition prompt 68. Note that these interrupt conditions 36 or prompts may be alerts or warnings which are audible (such as chimes, beeps, etc. that are produced by a piezo-transducer or heard through the vehicle's speakers), visual (such as lights or icons appearing on a display screen or instrument panel) and/or vibrational. Additionally or alternatively, the interrupt conditions or prompts may be flags set or switched in memory or registers, and/or triggers or state changes of mechanical elements that are mechanically set or tripped.

Returning to the flowchart of FIG. 1, the method 100 may further include sampling the occupancy data 22 at the selected first or second sampling rate $R_1$, $R_2$. For example, if the vehicle speed 74 is within the first/low speed range Kr, then at block 170 the first/low sampling rate $S_1$ will be selected, and at block 175 the occupancy data 22 may be sampled at the first/low sampling rate $S_1$, such as by utilizing one or more sensors 16. Similarly, if the vehicle speed 74 is within the second/high speed range $R_2$, and/or if an interrupt condition 36 has been detected, then at block 190 the second/high sampling rate $S_2$ will be selected, and at block 195 the occupancy data 22 may be sampled at the second/high sampling rate $S_2$.

The method 100 may further include repeating the determining step (block 120), the detecting step (block 130), the selecting steps (blocks 170 and 190) and the sampling steps (blocks 175 and 195), along with the steps at blocks 135, 140 and 160, for a plurality of cycles. This is illustrated by the horizontal flow lines proceeding to the right from blocks 175 and 195, each of which directly or indirectly then flows vertically upward toward block 220, which is an optional step of waiting or delaying for a predetermined dwell time, and then flows horizontally to the left back to block 120, whereupon the process flow cycle may be repeated.

Figure 3:
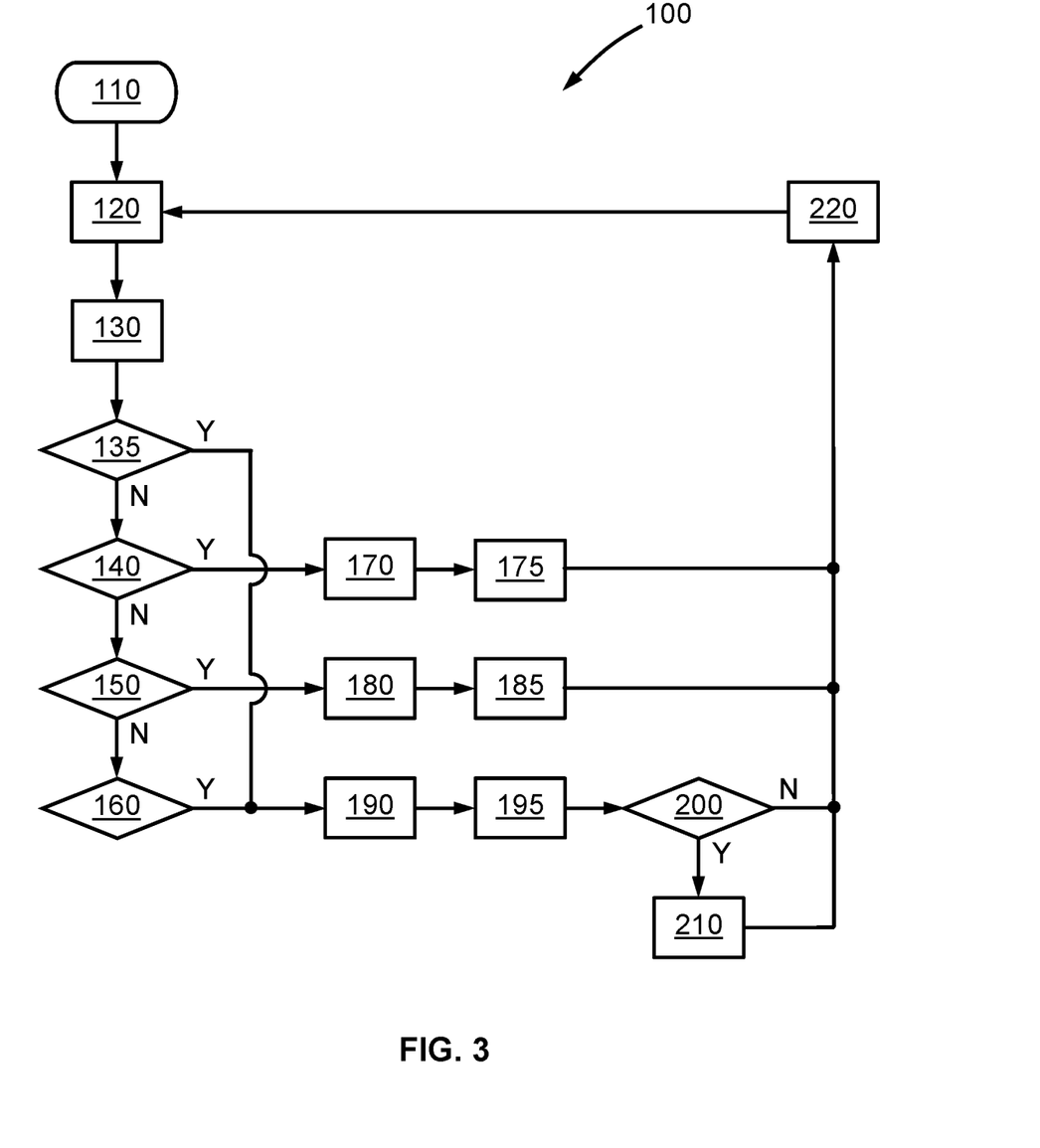
FIG. 3 is a flowchart of another embodiment of the method of the present disclosure.

The first and second sampling rates $R_1$, $R_2$ may be respective rates at which a controller onboard the vehicle 10 samples the occupancy data 22 from one or more sensors 16 onboard the vehicle 10. For example, as illustrated in FIG. 6, the controller may be a primary electronic control unit (ECU) 70 that is configured for sampling the occupancy data 22. The method 100 may further include transferring a portion of the computational demand of the primary ECU 70 that is associated with the sampling to one or more secondary ECUs 82 configured for sampling the occupancy data 22, if the second/high sampling rate $R_2$ is selected for sampling the occupancy data 22 and if the computational demand of the primary ECU 70 exceeds a predetermined threshold (e.g., 90% of the primary ECU's maximum computational capacity). This is illustrated in FIGS. 1 and 3, where a detection or interrogation is made at block 200 as to whether the primary ECU's usage has exceeded the predetermined threshold. If the threshold has been exceeded, then the process flow routes along the "Y" branch to block 210, where some of the primary ECU's computational demand is transferred to one or more secondary ECUs 82. However, if the threshold has not been exceeded, then the process flow routes along the "N" branch to optional block 220.

The method 100 may further include selecting a third sampling rate $S_3$ for sampling the occupancy data 22 if the speed 74 is within a third or "medium" speed range $R_3$ that is higher than the first/low speed range $R_1$ and lower than the second/high speed range $R_2$. In this arrangement, the third/medium sampling rate $S_3$ may be faster than the first/low sampling rate $S_1$ and slower than the second/high sampling rate $S_2$. This arrangement may further include sampling the occupancy data 22 at the selected first, second or third sampling rate $S_1$, $S_2$, $S_3$ and may further include repeating the determining, detecting, selecting and sampling steps 120, 130, 170, 180, 190, 175, 185, 195 (as well as the steps at blocks 135, 140, 150 and 160) for a plurality of cycles.

FIG. 3 shows a flowchart of another embodiment of the method 100. This embodiment is similar to the embodiment illustrated in FIG. 1 where a first/low speed range $R_1$ and sampling rate $S_1$ and a second/high speed range $R_2$ and sampling rate $S_2$ are illustrated, except that the embodiment of FIG. 3 also includes a third/medium speed range $R_3$ and sampling rate $S_3$. Here, the third/medium speed range $R_3$ is higher than the first/low speed range $R_1$ and lower than the second/high speed range $R_2$, and the third/medium sampling rate $S_3$ is faster than the first/low sampling rate $S_1$ and slower than the second/high sampling rate $S_2$. For example, the first/low speed range $R_1$ may be a vehicle speed 74 from 0 mph to 34.999 mph, the third/medium speed range $R_3$ may be from 35 mph to 54.999 mph, and the second/high speed range $R_2$ may be a vehicle speed 74 of 55 mph or greater. (Note that for this type of example where the second/high speed range $R_2$ is immediately above the third/medium range $R_3$, block 160 may be omitted.) Similarly, the first/low sampling rate $S_1$ may be once every five seconds, the third/medium sampling rate $S_3$ may be once every second, and the second/high sampling rate $S_2$ may be once every 20 milliseconds.

In FIG. 3, the method 100 for determining a sampling rate of occupancy data 22 for an automotive vehicle 10 begins at block 110 and includes the following steps: (i) at block 120, determining a speed 74 of the automotive vehicle 10; (ii) at block 130, detecting whether an interrupt condition 36 is present; (iii) at block 135, if an interrupt condition 36 is detected, then the process flow routes to block 190, but if no interrupt condition 36 is detected, then the process flow routes to block 140; (iv) if, at block 140, the speed 74 is within a first/low speed range $R_1$ and no interrupt condition 36 is detected, then, at block 170, selecting a first/low sampling rate $S_1$ for sampling the occupancy data 22; (v) if, at block 150, the speed 74 is within a third/medium speed range $R_3$ that is higher than the first speed range $R_1$ and lower than the second speed range $R_2$ (and no interrupt condition 36 is detected), then, at block 180, selecting a third/medium sampling rate $S_3$ for sampling the occupancy data 22, wherein the third sampling rate $S_3$ is faster than the first sampling rate $S_1$ and slower than the second sampling rate; (vi) if, at block 160, the speed 74 is within a second/high speed range $R_2$ that is higher than the third/medium speed range $R_3$ and/or if an interrupt condition 36 is detected, then, at block 190, selecting a second/high sampling rate $S_2$ for sampling the occupancy data 22, wherein the second/high sampling rate $S_2$ is faster than the third/medium sampling rate $S_1$; (vii) at blocks 175, 185 and 195, sampling the occupancy data 22 at the selected first/low, third/medium or second/high sampling rate $S_1$, $S_2$, $S_3$; and (viii) repeating the determining, detecting, selecting and sampling steps 120, 130, 170, 175, 180, 185, 190, 195 (along with the steps associated with blocks 135, 140, 150 and 160) for a plurality of cycles.

In this embodiment, the occupancy data 22 may include one or more of a presence 24 of a passenger 18 within the automotive vehicle 10, a location 26 of the passenger 18 within the automotive vehicle 10, a weight 28 of the passenger 18 within the automotive vehicle 10, a presence 29 of one or more connected devices 19 within the automotive vehicle 10 that are indicative of the presence 24 of a passenger 18 within the vehicle 10, a span 30 of the passenger 18 within the automotive vehicle 10, and a proximity 32 of the passenger 18 to a point of interest 13 within the automotive vehicle 10. Additionally, the interrupt condition 36 may include one or more of a gear selector status change prompt 38, a passenger weight sensor change prompt 40, a door opening prompt 42, a seatbelt unbuckling prompt 44, a vehicle proximity prompt 46, a collision alert prompt 48, a hard braking prompt 50, a hard acceleration prompt 52, a hard cornering prompt 54, a hard steering prompt 56, a lane keep assist warning prompt 58, a lane change prompt 60, a sudden heading change prompt 62, a driver biometrics prompt 64 and a distraction element warning prompt 66.

The first/low, third/medium and second/high sampling rates $S_1$, $S_2$, $S_3$ may be respective rates at which a controller onboard the automotive vehicle 10 samples the occupancy data 22 from one or more sensors 16 onboard the automotive vehicle 10. A primary ECU 70 may be configured for sampling the occupancy data 22, and the method 100 may further include, at block 200, a detection or interrogation as to whether the primary ECU's usage has exceeded a predetermined computational threshold. If the threshold has been exceeded, then the process flow routes to block 210, where a portion of a computational demand of the primary ECU 70 associated with the sampling is transferred to one or more secondary ECUs 82 configured for sampling the occupancy data 22, if the second/high sampling rate $S_2$ is selected for sampling the occupancy data 22 and the computational demand exceeds the predetermined threshold. However, if the threshold has not been exceeded, then the process flow routes to optional block 220.

FIG. 6 shows a block diagram of the system 20 for determining a sampling rate of occupancy data 22 for an automotive vehicle 10, according to yet another embodiment of the present disclosure. As shown, the system 20 includes: (i) a speed determination module 72 configured for determining a forward speed 74 of the automotive vehicle 10; (ii) an interrupt condition detection module 76 configured for detecting whether an interrupt condition 36 is present and for setting an interrupt condition flag 78 if the interrupt condition 36 is detected; (iii) a primary sampling module 70 configured for sampling the occupancy data 22 at a first sampling rate $S_1$ and at a second sampling rate $S_2$ that is faster than the first sampling rate $S_1$; and (iv) a workload control module 80 configured for receiving the speed 74 from the speed determination module 72 and the interrupt condition flag 78 from the interrupt condition detection module 76. The workload control module 80 is further configured to cause the primary sampling module 70 to sample the occupancy data 22 at the first sampling rate $S_1$ if the speed 74 is within a first speed range $R_1$ and no interrupt condition flag 78 is set, and cause the primary sampling module 70 to sample the occupancy data at the second sampling rate $S_2$ if the speed 74 is within a second speed range $S_2$ that is higher than the first speed range $S_1$ and/or if the interrupt condition flag 78 is set.

In this system 20, the occupancy data 22 may include one or more of a presence 24 of a passenger 18 within the automotive vehicle 10, a location 26 of the passenger 18 within the automotive vehicle 10, a weight 28 of the passenger 18 within the automotive vehicle 10, a presence 29 of one or more connected devices 19 within the automotive vehicle 10 that are indicative of the presence 24 of a passenger 18 within the vehicle 10, a span 30 of the passenger 18 within the automotive vehicle 10, and a proximity 32 of the passenger 18 to a point of interest 13 within the automotive vehicle 10. Additionally, the interrupt condition 36 may include one or more of a gear selector status change prompt 38, a passenger weight sensor change prompt 40, a door opening prompt 42, a seatbelt unbuckling prompt 44, a vehicle proximity prompt 46, a collision alert prompt 48, a hard braking prompt 50, a hard acceleration prompt 52, a hard cornering prompt 54, a hard steering prompt 56, a lane keep assist warning prompt 58, a lane change prompt 60, a sudden heading change prompt 62, a driver biometrics prompt 64 and a distraction element warning prompt 66.

In the system 20, the first and second sampling rates $S_1$, $S_2$ may be respective rates at which the primary sampling module 70 samples the occupancy data 22 from one or more sensors or intermediary devices 16 onboard the automotive vehicle 10. The system 20 may further include one or more secondary sampling modules 82 configured for sampling the occupancy data 22, wherein the workload control module 80 may be further configured to cause a portion of a computational demand of the primary sampling module 70 associated with the sampling to be transferred to the one or more secondary sampling modules 82, if the second sampling rate $S_2$ is selected for sampling the occupancy data 22 and the computational demand exceeds a predetermined threshold. Note that this optional routing of a portion of the primary sampling module's computational demand to the secondary sampling module(s) 82 is shown in dashed lines. Further, note that this re-routed portion of the computational demand may include the secondary sampling module(s) 82 sensing or receiving occupancy data 22 directly from one or more sensors 16 and/or receiving occupancy data 22 from the primary sampling module 70.

Moreover, while the system 20 has been described above as utilizing first and second speed ranges $R_1$, $R_2$ and first and second sampling rates $S_1$, $S_2$, similar to the method 100 illustrated in FIG. 1, the system 20 may also utilize a third speed range $R_3$ and a third sampling rate $S_3$, similar to the method 100 illustrated in FIG. 3.

While various steps of the method 100 have been described as being separate blocks, and various functions of the system 20 have been described as being separate modules or elements, it may be noted that two or more steps may be combined into fewer blocks, and two or more functions may be combined into fewer modules or elements. Similarly, some steps described as a single block may be separated into two or more blocks, and some functions described as a single module or element may be separated into two or more modules or elements. Additionally, the order of the steps or blocks described herein may be rearranged in one or more different orders, and the arrangement of the functions, modules and elements may be rearranged into one or more different arrangements.

As used herein, a "module" may include hardware and/or software, including executable instructions, for receiving one or more inputs, processing the one or more inputs, and providing one or more corresponding outputs. Also note that at some points throughout the present disclosure, reference may be made to a singular input, output, element, etc., while at other points reference may be made to plural/multiple inputs, outputs, elements, etc. Thus, weight should not be given to whether the input(s), output(s), element(s), etc. are used in the singular or plural form at any particular point in the present disclosure, as the singular and plural uses of such words should be viewed as being interchangeable, unless the specific context dictates otherwise.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method for determining a sampling rate of occupancy data for an automotive vehicle, comprising:
   determining a speed of the automotive vehicle;
   detecting whether an interrupt condition is present;
   if the speed is within a first speed range and no interrupt condition is detected, then selecting a first sampling rate for sampling the occupancy data; and
   if the speed is within a second speed range that is higher than the first speed range and/or if the interrupt condition is detected, then selecting a second sampling rate for sampling the occupancy data, wherein the second sampling rate is faster than the first sampling rate.

2. The method of claim 1, wherein the occupancy data includes one or more of:
   a presence of a passenger within the automotive vehicle;
   a location of the passenger within the automotive vehicle;
   a weight of the passenger within the automotive vehicle;
   a presence of a connected device indicative of the presence of the passenger within the automotive vehicle;
   a span of the passenger within the automotive vehicle; and
   a proximity of the passenger to a point of interest within the automotive vehicle.

3. The method of claim 1, wherein the interrupt condition includes one or more of a gear selector status change prompt, a passenger weight sensor change prompt, a door opening prompt, a seatbelt unbuckling prompt, a vehicle proximity prompt, a collision alert prompt, a hard braking prompt, a hard acceleration prompt, a hard cornering prompt, a hard steering prompt, a lane keep assist warning prompt, a lane change prompt, a sudden heading change prompt, a driver biometrics prompt and a distraction element warning prompt.

4. The method of claim 1, wherein the first and second sampling rates are respective rates at which a controller onboard the automotive vehicle samples the occupancy data from one or more sensors onboard the automotive vehicle.

5. The method of claim 1, further comprising:
sampling the occupancy data at the selected first or second sampling rate.

6. The method of claim 5, further comprising:
repeating the determining, detecting, selecting and sampling steps for a plurality of cycles.

7. The method of claim 1, further comprising:
if the speed is within a third speed range that is higher than the first speed range and lower than the second speed range, then selecting a third sampling rate for sampling the occupancy data, wherein the third sampling rate is faster than the first sampling rate and slower than the second sampling rate.

8. The method of claim 7, further comprising:
sampling the occupancy data at the selected first, second or third sampling rate.

9. The method of claim 8, further comprising:
repeating the determining, detecting, selecting and sampling steps for a plurality of cycles.

10. The method of claim 1, wherein a primary electronic control unit (ECU) is configured for sampling the occupancy data, the method further comprising:
if the second sampling rate is selected for sampling the occupancy data and a computational demand of the primary ECU associated with the sampling exceeds a predetermined threshold, then transferring a portion of the computational demand to one or more secondary ECUs configured for sampling the occupancy data.

11. A method for determining a sampling rate of occupancy data for an automotive vehicle, comprising:
(i) determining a speed of the automotive vehicle;
(ii) detecting whether an interrupt condition is present;
(iii) if the speed is within a low speed range and no interrupt condition is detected, then selecting a low sampling rate for sampling the occupancy data;
(iv) if the speed is within a medium speed range that is higher than the low speed range and no interrupt condition is detected, then selecting a medium sampling rate for sampling the occupancy data, wherein the medium sampling rate is faster than the low sampling rate;
(v) if the speed is within a high speed range that is higher than the medium speed range and/or if the interrupt condition is detected, then selecting a high sampling rate for sampling the occupancy data, wherein the high sampling rate is faster than the medium sampling rate;
(vi) sampling the occupancy data at the selected low, medium or high sampling rate; and
(vii) repeating the determining, detecting, selecting and sampling steps for a plurality of cycles.

12. The method of claim 11, wherein the occupancy data includes one or more of:
a presence of a passenger within the automotive vehicle;
a location of the passenger within the automotive vehicle;
a weight of the passenger within the automotive vehicle;
a presence of a connected device indicative of the presence of the passenger within the automotive vehicle;
a span of the passenger within the automotive vehicle; and
a proximity of the passenger to a point of interest within the automotive vehicle.

13. The method of claim 11, wherein the interrupt condition includes one or more of a gear selector status change prompt, a passenger weight sensor change prompt, a door opening prompt, a seatbelt unbuckling prompt, a vehicle proximity prompt, a collision alert prompt, a hard braking prompt, a hard acceleration prompt, a hard cornering prompt, a hard steering prompt, a lane keep assist warning prompt, a lane change prompt, a sudden heading change prompt, a driver biometrics prompt and a distraction element warning prompt.

14. The method of claim 11, wherein the low, medium and high sampling rates are respective rates at which a controller onboard the automotive vehicle samples the occupancy data from one or more sensors onboard the automotive vehicle.

15. The method of claim 1, wherein a primary electronic control unit (ECU) is configured for sampling the occupancy data, the method further comprising:
if the high sampling rate is selected for sampling the occupancy data and a computational demand of the primary ECU associated with the sampling exceeds a predetermined threshold, then transferring a portion of the computational demand to one or more secondary ECUs configured for sampling the occupancy data.

16. A system for determining a sampling rate of occupancy data for an automotive vehicle, comprising:
a speed determination module configured for determining a speed of the automotive vehicle;
an interrupt condition detection module configured for detecting whether an interrupt condition is present and for setting an interrupt condition flag if the interrupt condition is detected;
a primary sampling module configured for sampling the occupancy data at a first sampling rate and at a second sampling rate that is faster than the first sampling rate; and
a workload control module configured for receiving the speed from the speed determination module and the interrupt condition flag from the interrupt condition detection module, the workload control module being further configured to:
cause the primary sampling module to sample the occupancy data at the first sampling rate, if the speed is within a first speed range and no interrupt condition flag is set; and
cause the primary sampling module to sample the occupancy data at the second sampling rate, if the speed is within a second speed range that is higher than the first speed range and/or if the interrupt condition flag is set.

17. The system of claim 16, wherein the occupancy data includes one or more of:
a presence of a passenger within the automotive vehicle;
a location of the passenger within the automotive vehicle;
a weight of the passenger within the automotive vehicle;
a presence of a connected device indicative of the presence of the passenger within the automotive vehicle;
a span of the passenger within the automotive vehicle; and
a proximity of the passenger to a point of interest within the automotive vehicle.

18. The system of claim 16, wherein the interrupt condition includes one or more of a gear selector status change prompt, a passenger weight sensor change prompt, a door opening prompt, a seatbelt unbuckling prompt, a vehicle proximity prompt, a collision alert prompt, a hard braking prompt, a hard acceleration prompt, a hard cornering prompt, a hard steering prompt, a lane keep assist warning prompt, a lane change prompt, a sudden heading change prompt, a driver biometrics prompt and a distraction element warning prompt.

19. The system of claim 16, wherein the first and second sampling rates are respective rates at which the primary sampling module samples the occupancy data from one or more sensors onboard the automotive vehicle.

20. The system of claim 16, further comprising:
one or more secondary sampling modules configured for sampling the occupancy data;
wherein the workload control module is further configured to:
cause a portion of a computational demand of the primary sampling module associated with the sampling to be transferred to the one or more secondary sampling modules, if the second sampling rate is selected for sampling the occupancy data and the computational demand exceeds a predetermined threshold.

* * * * *